United States Patent [19]

Tanaka et al.

[11] Patent Number: 5,312,874
[45] Date of Patent: May 17, 1994

[54] POLY(BENXOIC ACID), METHOD FOR THE PREPARATION THEREOF AND METHOD FOR THE PREPARATION OF POLY(P-PHENYLENE) FROM POLY(BENZOIC ACID)

[75] Inventors: Susumu Tanaka, Tsukuba; Kyoji Kaeriyama, Tsuchiura, both of Japan

[73] Assignee: Japan as represented by Director General of Agency of Industrial Science and Technology, Tokyo, Japan

[21] Appl. No.: 116,702

[22] Filed: Sep. 7, 1993

[30] Foreign Application Priority Data

Sep. 7, 1992 [JP] Japan ................................. 4-264295

[51] Int. Cl.$^5$ ...................... C08G 83/00; C08G 61/10
[52] U.S. Cl. ..................................... 525/418; 528/271
[58] Field of Search ......................... 525/418; 528/271

[56] References Cited

PUBLICATIONS

Wallow et al., J. Am. Chem. Soc., 113 7411-7412 (1991).
Percec et al., Macromolecules, 25, 1816-1823 (1992).

Primary Examiner—Harold D. Anderson
Attorney, Agent, or Firm—Wenderoth, Lind & Ponack

[57] ABSTRACT

Disclosed is a novel polymeric compound poly(benzoic acid) which is a linear polymer consisting of the 1,4-phenylene linkages, each phenylene group having a carboxyl group. Poly(benzoic acid) can be prepared by hydrolyzing a poly(alkyl benzoate) in the presence of an acid or alkali. The thus obtained poly(benzoic acid) can be converted into a poly(p-phenylene) by the decarbonation reaction thereof in an organic solvent such as quinoline in the presence of metallic copper dust or a copper (II) compound such as copper (II) oxide and copper (II) carbonate hydroxide.

4 Claims, 2 Drawing Sheets

POLY(BENXOIC ACID), METHOD FOR THE PREPARATION THEREOF AND METHOD FOR THE PREPARATION OF POLY(P-PHENYLENE) FROM POLY(BENZOIC ACID)

BACKGROUND OF THE INVENTION

The present invention relates to a poly(benzoic acid), which is a novel compound not known in the prior art nor described in any literatures, a method for the preparation of a poly(benzoic acid) and a method for the preparation of a poly(p-phenylene) having electroconductivity, oxidation-reduction characteristic and excellent heat resistance and suitable as a polymeric electroconductive material and material of a heat-resistant polymer from the poly(benzoic acid).

Poly(p-phenylene) is a known polymeric material having good electroconductivity and excellent heat resistance. Despite these unique properties as an organic polymer, the industrial application field of poly(p-phenylene) is still not so wide because of the difficult problems that poly(p-phenylene) is an insoluble and infusible polymer so that no conventional method is applicable to the molding work of the polymer and that the molecular weight thereof cannot be high enough with a relatively irregular molecular structure not to give a reproducible quality.

A method for the preparation of a poly(p-phenylene) is disclosed in Journal of the American Chemical Society, volume 85, pages 454–458 (1963), according to which benzene is subjected to oxidative polymerization in the presence of aluminum chloride and copper (II) chloride. An alternative method is proposed in Synthetic Metals, volume 44, pages 107–110 (1992), in which benzene is electrolytically polymerized in fuming sulfuric acid to give a poly(p-phenylene). These methods, however, are practically defective since, in the former method, the poly(p-phenylene) is obtained in the form of a powder which is not susceptible to molding and, in the latter method, the polymer obtained has only a quit low degree of polymerization with consequently poor electric and mechanical properties although the polymer is obtained in the form of a film deposited on the surface of the electrode.

Besides, a method is proposed in Macromolecules, volume 21, pages 294–304 (1988), in which a poly(p-phenylene) is obtained in the form of a film through an intermediate having moldability. The polymer obtained by this method, however, does not consist of the 1,4-phenylene units alone but contains about 15% of the 1,2-phenylene units so that the electric properties thereof are not as desired.

SUMMARY OF THE INVENTION

The present invention accordingly has a primary object to provide a poly(benzoic acid) which is a novel polymeric compound having moldability and can be an intermediate for the preparation of a poly(p-phenylene) consisting substantially of the 1,4-phenylene units only as a secondary object of the invention.

Namely, the present invention provides a poly(benzoic acid) which is a linear polymer consisting of the recurring monomeric units expressed by the chemical formula

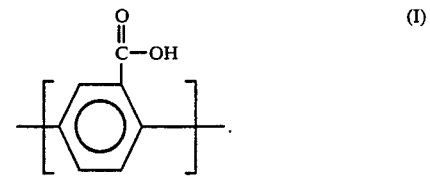

In particular, a poly(benzoic acid) having a number-average degree of polymerization in the range from 30 to 20,000 can be readily prepared by the method described hereinbelow.

Further, the method of the invention for the preparation of a poly(p-phenylene) comprises subjecting the above mentioned poly(benzoic acid) to a decarbonation reaction in the presence of a copper dust or a copper (II) compound.

DETAILED DESCRIPTION OF THE PREFERRED EMBODIMENTS

Figure 1:
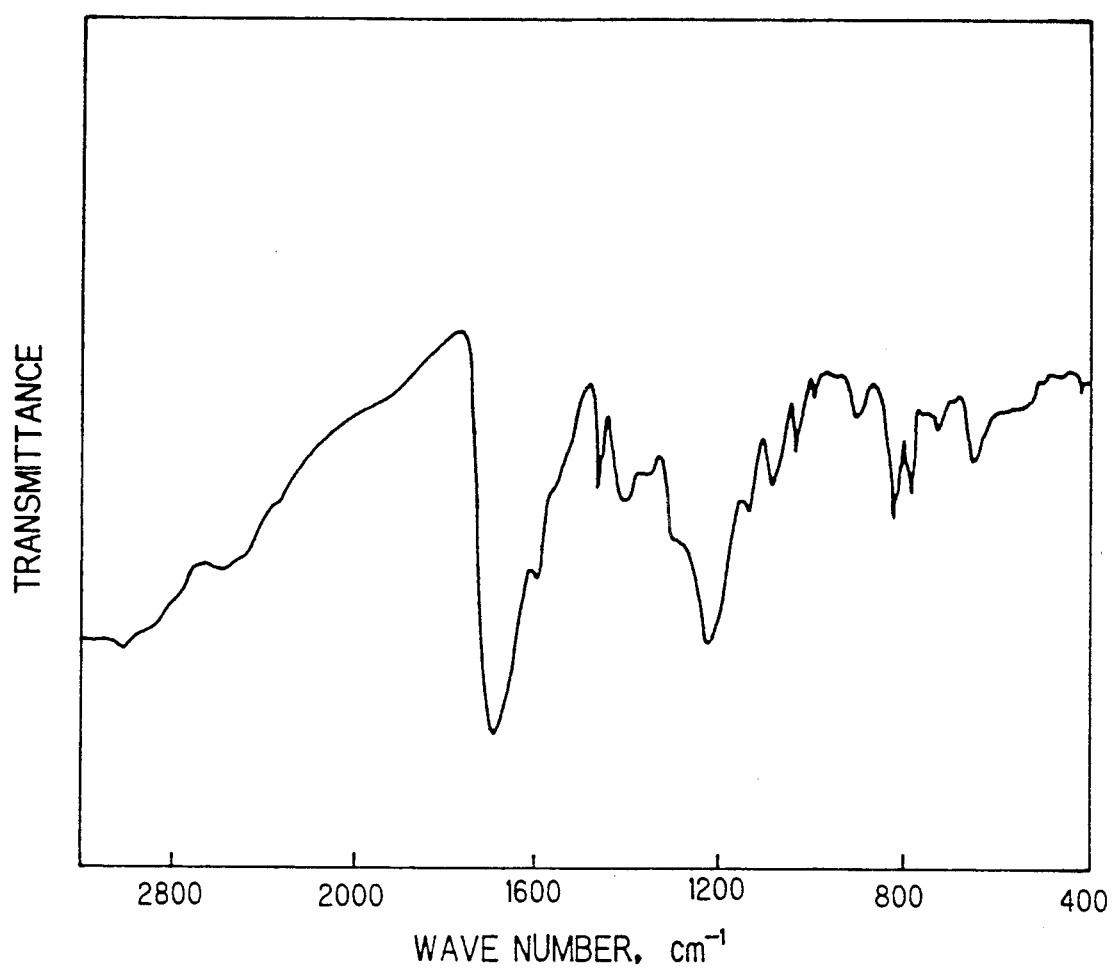
FIG. 1 is an infrared absorption spectrum of a poly(benzoic acid) prepared in Example 1.

The poly(benzoic acid) of the present invention, which is a novel compound not known in the prior art, Can be prepared by the hydrolysis of a poly(alkyl benzoate) represented by the general formula

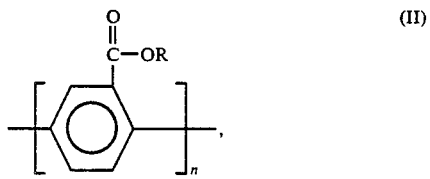

in which R is a lower alkyl group having 1 to 4 carbon atoms, such as methyl, ethyl, propyl and butyl groups, and the subscript n is a positive number giving the number-average degree of polymerization, in particular, in the range from 30 to 2000. The hydrolysis reaction of a poly(alkyl benzoate) can be performed by using an acid or alkali as the catalyst. The poly(alkyl benzoate), e.g., poly(methyl benzoate), poly(ethyl benzoate), poly(propyl benzoate) or poly(butyl benzoate), as the starting material for the preparation of a poly(benzoic acid) can be prepared, for example, by the polycondensation reaction of an alkyl 2,5-dichlorobenzoate, e.g., methyl 2,5-dichlorobenzoate, in the presence of nickel bromide, triphenyl phosphine and metallic zinc according to the procedure disclosed in Macromolecules, volume 25, page 1816 (1992).

The poly(benzoic acid) of the present invention can readily be converted into a poly(p-phenylene) when it is heated in an organic solvent in the presence of a catalyst to effect decarbonation reaction. Suitable catalysts for the decarbonation reaction include metallic copper dust and compounds of divalent copper such as copper (II) oxide, copper (II) carbonate and the like. Namely, the poly(benzoic acid) is dissolved in an organic solvent such as quinoline, N,N-dimethyl aniline and the like and the solution, in which the above mentioned copper catalyst is suspended, is heated at a temperature in the range from 130° to 300° C. or, preferably, from 170° to 260° C. so that the poly(p-phenylene) as formed is precipitated in the solution. The thus produced poly(p-phenylene) is insoluble in any organic solvents so that no known methods are applicable to the determination of the degree of polymerization thereof. It would be a fair assumption, however, that the above described reactions of the hydrolysis of the poly(alkyl benzoate) and decarbonation of the poly(benzoic acid) do not affect the degree of polymerization of the polymer so that the average degree of polymerization of the thus obtained poly(p-phenylene) be identical with that of the starting poly(alkyl benzoate).

The present invention provides a means to easily obtain a poly(benzoic acid) which is soluble in many organic solvents and capable of being shaped into any desired forms such as a film. Accordingly, the present invention provides a possibility for the preparation of a shaped body, e.g., films and sheets, of a poly(p-phenylene), which is considered in the prior art to be insusceptible to molding or shaping due to the insolubility thereof in organic solvents, by first shaping a poly(benzoic acid) into a film or sheet followed by a decarbonation treatment thereof in a suitable organic solvent while keeping the shape of the Polymer as such.

In the following, examples are given to illustrate the poly(benzoic acid) and the inventive method for the preparation thereof as well as the method for the preparation of a poly(p-phenylene) from the poly(benzoic acid) in more detail. The Reference Example given below preceding the Examples describes a method for the preparation of a poly(methyl benzoate).

Reference Example

Into a three-necked flask were introduced 1.30 g of nickel (II) bromide, 11.9 g of triphenyl phosphine and 12.1 g of metallic zinc dust together with 90 ml of N,N-dimethyl formamide to form a reaction mixture which was heated at a temperature of 40° to 45 ° C. under an atmosphere of argon with agitation. When the color of the reaction mixture turned reddish, a solution of 12.3 g of methyl 2,5-dichlorobenzoate in 60 ml of N,N-dimethyl formamide was added dropwise into the reaction mixture which was heated at 80° C. for 48 hours thereafter. After the end of this reaction time, the reaction mixture cooled to room temperature was admixed with an excess volume of acetone and agitated for 30 minutes followed by filtration to remove the unreacted methyl 2,5-dichlorobenzoate and triphenyl phosphine. The cake of the precipitates obtained by filtration was dispersed in an excess volume of diluted hydrochloric acid to dissolve the zinc dust followed by filtration of the mixture to collect the undissolved precipitates which were successively washed with water, methyl alcohol and acetone followed by drying in a vacuum desiccator at 60° C. for 5 hours. The thus obtained product could be identified to be a poly(methyl benzoate) having a number-average degree of polymerization of 106. The yield of this product was 85% of the theoretical value.

EXAMPLE 1

A reaction mixture consisting of 5 g of the poly(methyl benzoate) prepared in Reference Example described above and 50 ml of a 20% methyl alcohol solution of sodium hydroxide was heated for 1.5 hours under reflux. The reaction mixture was added to a dilute hydrochloric acid and heated therein for 10 minutes. The precipitates in the reaction mixture were collected by filtration, washed with water and dried under reduced pressure to give a white powder which could be identified to be a poly(benzoic acid) having a number-average degree of polymerization of 106. The yield of the product was approximately quantitative according to the stoichiometry. This poly(benzoic acid) was soluble in quinoline, pyridine and an aqueous solution of sodium hydroxide. FIG. 1 of the accompanying drawing shows an infrared absorption spectrum of the poly(benzoic acid). The characteristic peaks in the spectrum at wave numbers of 1710 cm$^{-1}$ and 1230 cm$^{-1}$ could be assigned to the stretching vibration of the C=O bond and stretching vibration of the C—O bond, respectively.

EXAMPLE 2

Figure 2:
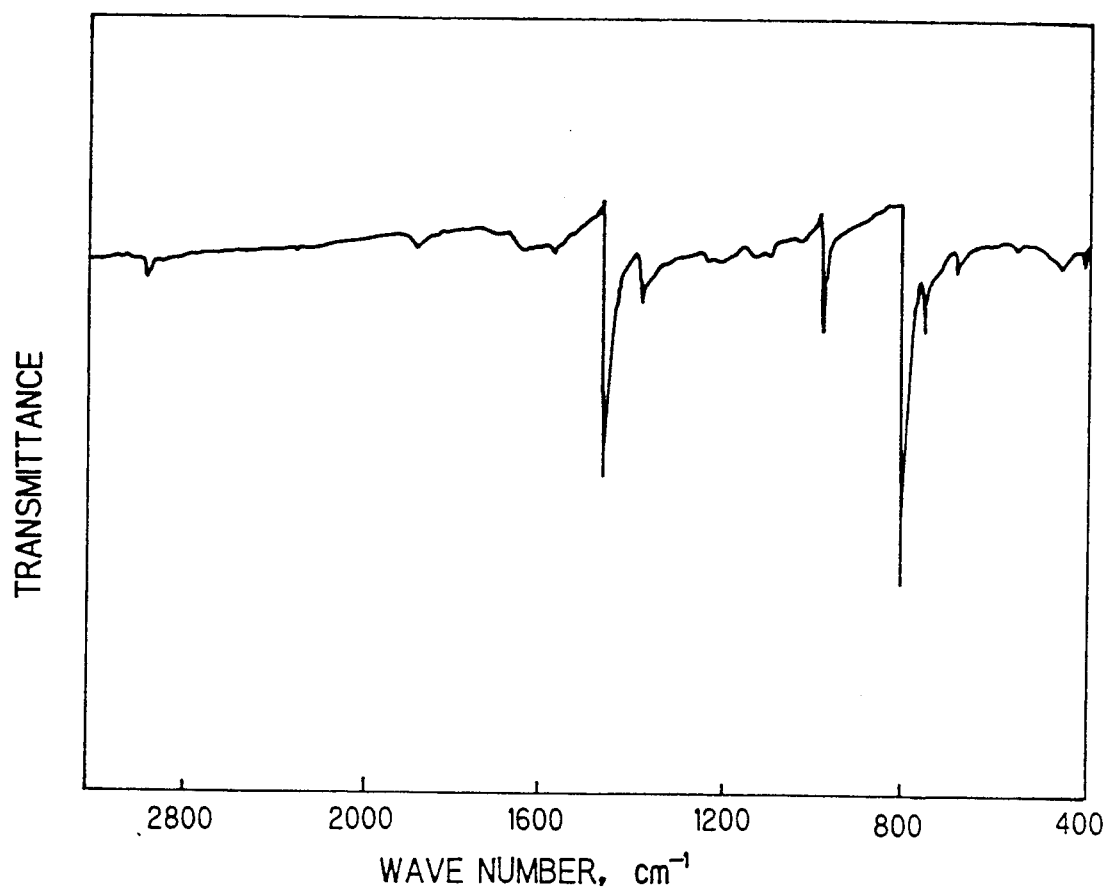
FIG. 2 is an infrared absorption spectrum of a poly(p-phenylene) prepared in Example 2.

A reaction mixture formed by adding 3.5 g of the poly(benzoic acid) prepared in Example 1 and 0.32 g of copper (II) oxide to 50 ml of quinoline was heated under reflux for 5 hours in an atmosphere of argon. After the end of the reaction time, the reaction mixture was admixed under agitation with acetone to remove quinoline and the precipitates separated from the reaction mixture were agitated in a dilute hydrochloric acid to remove the inorganic matter. The precipitates collected by filtration was successively washed with water and methyl alcohol followed by drying in a vacuum desiccator at 60° C. for 5 hours. The thus obtained product in a powdery form could be identified to be a poly(p-phenylene) from the infrared absorption spectrum shown in FIG. 2 of the accompanying drawing, in which the strong and sharp peak at about 800 cm$^{-1}$ could be assigned to the 1,4-phenylene linkage. The yield of the product was approximately quantitative assuming the stoichiometry of the decarbonation reaction. This poly(p-phenylene) was insoluble in any organic solvents as well as in an aqueous alkali or acid solution.

EXAMPLE 3

A reaction mixture formed by adding 3.0 g of the poly(benzoic acid) prepared in Example 1 and 0.14 g of copper (II) carbonate hydroxide to 48 ml of quinoline was heated under reflux for 5 hours in an atmosphere of argon. The reaction mixture was treated subsequently in the same manner as in Example 2 to give a product in a powder form. This product could be identified to be poly(p-phenylene) from the infrared absorption spectrum which was substantially identical with that of the product obtained in Example 2. This poly(p-phenylene) product was also insoluble in any organic solvents as well as in an aqueous alkali or acid solution.

What is claimed is:

1. A method for the preparation of a poly(p-phenylene) which comprises heating a solution of a poly(benzoic acid) in an organic solvent in the presence of metallic copper dust or a copper (II) compound as the catalyst to effect a decarbonation reaction.

2. The method for the preparation of a poly(p-phenylene) as claimed in claim 1 in which the organic solvent is quinoline or N,N-dimethyl aniline.

3. The method for the preparation of a poly(p-phenylene) as claimed in claim 1 in which the catalyst is copper (II) oxide or copper (II) carbonate hydroxide.

4. The method for the preparation of a poly(p-phenylene) as claimed in claim 1 in which the heating temperature of the solution of a poly(benzoic acid) is in the range from 130° to 300° C.

* * * * *

UNITED STATES PATENT AND TRADEMARK OFFICE
CERTIFICATE OF CORRECTION

PATENT NO. : 5,312,874
DATED : May 17, 1994
INVENTOR(S) : Susumu TANAKA et al.

It is certified that error appears in the above-indentified patent and that said Letters Patent is hereby corrected as shown below:

<u>IN THE TITLE</u>:

Line 1, change "POLY(BENXOIC ACID)" TO --POLY(BENZOIC ACID)--; and

Line 4, change "POLY(P-PHENYLENE)" to --POLY(p-PHENYLENE)--.

Column 1, line 1, change "POLY(BENXOIC ACID)" TO --POLY(BENZOIC ACID)--; and line 3, change "POLY(P-PHENYLENE)" to --POLY(p-PHENYLENE)--.

Signed and Sealed this

Twenty-eight Day of February, 1995

Attest:

BRUCE LEHMAN

*Attesting Officer*     *Commissioner of Patents and Trademarks*